(12) United States Patent
Bottomley et al.

(10) Patent No.: US 8,599,972 B2
(45) Date of Patent: Dec. 3, 2013

(54) SIR ESTIMATION IN A WIRELESS RECEIVER

(75) Inventors: Gregory Edward Bottomley, Cary, NC (US); Carmela Cozzo, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 2356 days.

(21) Appl. No.: 10/869,456

(22) Filed: Jun. 16, 2004

(65) Prior Publication Data
US 2005/0281358 A1 Dec. 22, 2005

(51) Int. Cl.
*H03D 1/00* (2006.01)

(52) U.S. Cl.
USPC ...... 375/343; 329/320; 342/357.59; 375/144; 375/148; 375/346

(58) Field of Classification Search
USPC .......... 370/318, 335, 342; 375/147, 148, 227, 375/346; 455/522
See application file for complete search history.

(56) References Cited

U.S. PATENT DOCUMENTS

| | | |
|---|---|---|
| 5,875,215 A | 2/1999 | Dobrica |
| 6,002,715 A | 12/1999 | Brailean et al. |
| 6,028,894 A | 2/2000 | Oishi et al. |
| 6,034,952 A | 3/2000 | Dohi et al. |
| 6,108,374 A | 8/2000 | Balachandran et al. |
| 6,137,788 A | 10/2000 | Sawahashi et al. |
| 6,144,861 A | 11/2000 | Sundelin et al. |
| 6,157,820 A | 12/2000 | Sourour et al. |
| 6,259,752 B1 | 7/2001 | Domino et al. |
| 6,292,519 B1 | 9/2001 | Popovic |
| 6,385,183 B1 | 5/2002 | Takeo |
| 6,426,971 B1 | 7/2002 | Wu et al. |
| 6,618,433 B1 * | 9/2003 | Yellin .......................... 375/148 |
| 2002/0034216 A1 | 3/2002 | Yanagi |
| 2002/0115468 A1 | 8/2002 | Haim |
| 2002/0141486 A1 | 10/2002 | Bottomley et al. |
| 2002/0159514 A1 | 10/2002 | Miyoshi et al. |
| 2002/0186761 A1 | 12/2002 | Corbaton et al. |
| 2002/0196879 A1 | 12/2002 | Iochi |
| 2003/0016740 A1 | 1/2003 | Jeske et al. |
| 2003/0031135 A1 | 2/2003 | Itoh |

(Continued)

FOREIGN PATENT DOCUMENTS

| | | |
|---|---|---|
| EP | 1 111 815 | 6/2001 |
| EP | 1239615 A1 | 9/2002 |

(Continued)

OTHER PUBLICATIONS

A. Sampath and D.R. Jeske, "Analysis of signal-to-interference ratio estimation methods for wireless communications systems," in *Proc. IEEE Intl. Conf. Commun. (ICC)*, Jun. 2001, pp. 2499-2503.

(Continued)

*Primary Examiner* — Adolf Dsouza
(74) *Attorney, Agent, or Firm* — Coats & Bennett, P.L.L.C.

(57) ABSTRACT

A method and apparatus removes bias from an initial signal-to-interference ratio (SIR). In an exemplary embodiment, an initial SIR calculator in an SIR processor calculates the initial SIR based on the signal received by the wireless receiver, while an average SIR calculator in the SIR processor generates an average SIR. Using the average SIR, a bias remover removes the bias from the initial SIR.

40 Claims, 9 Drawing Sheets

(56) References Cited

U.S. PATENT DOCUMENTS

| | | |
|---|---|---|
| 2003/0031279 A1 | 2/2003 | Blount et al. |
| 2003/0058821 A1 | 3/2003 | Lee et al. |
| 2003/0096618 A1 | 5/2003 | Palenius |
| 2003/0114179 A1 | 6/2003 | Smolyar et al. |
| 2003/0189979 A1 | 10/2003 | Li et al. |

FOREIGN PATENT DOCUMENTS

| | | |
|---|---|---|
| EP | 1 341 335 | 9/2003 |
| GB | 2382748 A | 6/2003 |
| WO | WO 01/01601 | 1/2001 |
| WO | WO 01/56183 | 8/2001 |
| WO | WO 01/65717 | 9/2001 |
| WO | WO 03/049337 | 6/2003 |
| WO | WO 03/061184 | 7/2003 |
| WO | WO 03/063376 | 7/2003 |

OTHER PUBLICATIONS

L. M. A. Jalloul, M. Kohlmann and J. Medlock, "SIR estimation and closed-loop power control for 3G," in *Proc. IEEE Veh. Technol. Conf. (VTC)*, Orlando, FL, Oct. 6-9, 2003.

C. Cozzo, G.E. Bottomley, and A.S. Khayrallah, "RAKE receiver finger placement for realistic channels," in *Proc. IEEE Wireless Commun. and Networking Conf. (WCNC)*, Atlanta, GA, Mar. 21-25, 2004.

3rd Generation Partnership Project (3GPP), TR 25.943, v5.1.0, Jun. 2002.

C. Cozzo and G.E. Bottomely, "DS-CDMA SIR Estimation with Bias Removal," at IEEE WCNC Conference, Mar. 2005.

U.S. Appl. No. 10/869,527, filed Jun. 16, 2004, Wang, et al.; Benign Interference Suppression for Received Signal Quality Estimation; 45 pgs.

U.S. Appl. No. 60/580,202, filed Jun. 16, 2004, Wallén; Reduction of SIR Estimation Bias Under Frequency Error; 14 pgs.

Bottomley, G.E., Ottosson, T., and Wang, Y.-P. E, "A generalized RAKE receiver for interference suppression," IEEE J. Sel. Areas in Commun., vol. 18, Aug. 2000, pp. 1536-1545.

Lee, C.-C. and Steele, R., "Closed-loop power control in CDMA systems," IEEE Proc.-Commun., vol. 143. Aug. 1996, pp. 231-239.

Usuda, M., Ishakawa, Y., and Onoe, S., "Optimizing the number of dedicated pilot symbols for forward link in W-CDMA systems," in Proc. IEEE Veh. Technol. Conf., Tokyo, Japan, May 15-18, 2000, pp. 2118-2122.

Dohi, T., Okumura, Y., and Adachi, F., "Further results on field experiments of coherent wideband DS-CDMA mobile radio," IEICE Trans. Commun., vol. E81-B, No. 6, Jun. 1998, pp. 1239-1247.

Higuchi, K., Andoh, H., Sawahashi, M., and Adachi, F., "Experimental evaluation of combined effect of coherent Rake combining and SIR-based fast transmit power control for reverse link of DS-CDMA mobile radio," IEEE J. Sel. Areas Commun., vol. 18, Aug. 2000, pp. 1526-1535.

Wiesel, A., Goldberg, J., and Messer, H., "Data-aided signal-to-noise-ratio estimation in time selective fading channels," in Proc. IEEE Intl. Conf. on Acoustics, Speech, and Sig. Proc. (ICASSP), Orlando, May 13-17, 2002, pp. III-2197-III-2200.

Falahati, S., Svensson, A., Ekman, T., and Sternad, M., "Effect of channel prediction errors on adaptive modulation systems for wireless channels," in Proc. RadioVetenskap och Kommunikation 02 (RVK-02), Stockholm, Sweden, Jun. 10-13, 2002.

Boudreau, D., et al., "Wide-band CDMA for the UMTS/IMT-2000 satellite component," IEEE Trans. Veh. Technol., vol. 51, Mar. 2002, pp. 306-331.

Gunaratne, S., Taaghol, P., and Tafazolli, R., "Signal quality estimation algorithm," IEEE Electronics Letters. vol. 36, Oct. 26, 2000, pp. 1882-1884.

Wiesel, A., Goldberg, J., and Messer, H., "Non-data-aided signal-to-noise-ratio estimation," in Proc. IEEE Intl. Conf. Commun. (ICC), New York, NY, Apr. 28-May 2, 2002. pp. 197-201.

Wiesel, A., Goldberg, J., and Messer, H., "Signal-to-noise-ratio estimation in time selective fading channels," Thesis Presentation, Tel Aviv University, Mar. 2002.

Fahmer, A., Dieterich, H., and Frey, T., "SIR estimation for fast power control for FDD-UMTS," in Proc. IEEE Veh. Technol. Conf. (VTC), Vancouver, Canada, Sep. 24-28, 2002, pp. 1274-1278.

Yoon, Y.-S., and Lee, Y.-H, "Adaptive SIR estimation in WCDMA systems," in Proc. IEEE Veh. Technol. Conf. (VTC), Birmingham, Alabama, May 6-9, 2002, pp. 275-279.

Ekman, T., Sternad, M., and Ahlén, A., "Unbiased power prediction of Rayleigh fading channels," in Proc. IEEE Veh. Technol. Conf. (VTC), Vancouver, Canada, Sep. 24-28, 2002, pp. 280-284.

Hua, Z., "Traffic channel SIR estimation based on reverse pilot channel," in Proc. IEEE ICCT, Bejing, China, Apr. 9-11, 2003.

Pauluzzi, D., and Beaulieu, N., "A comparison of SNR estimation techniques for the AWGN channel," IEEE Trans. on Commun., vol. 48, No. 10, Oct. 2002, pp. 1681-1691.

Won, S.H., Kim, W.W., Ahn, J., and Lyn, D.-S., "An unbiased signal-to-interference ratio estimator for high speed downlink packet access system," ETRI Journal, vol. 25, No. 5. Oct. 2003.

Gunaratne, S., Jeans, T.G., Tafazolli, R., and Evans, B.G., "Comparison of SIR estimation techniques for closed-loop power control in the WCDMA system," in Proc. European Wireless 2002 Conf., Florence, Italy, Feb. 25-28, 2002.

Cheng, J.-F., Wang, Y.-P.E., and Parkvall, S., "Adaptive incremental redundancy," in Proc. IEEE VTC Conf., Fall 2003.

Seo, S., Dohi, T., and Adachi, F., "SIR-based transmit power control of reverse link for coherent DS-CDMA mobile radio," IEICE Trans. on Commun., vol. E-81, No. 7. Jul. 1998.

3GPP TS 25.101 V5.7.0. (Jun. 2003); $3^{rd}$ Generation Partnership Project; Technical Specification Group Radio Access Network; User Equipment (UE) radio transmission and reception (FDD) (Release 5); 96 pgs.

3GPP TS 25.214 V5.3.0 (Dec. 2002); $3^{rd}$ Generation Partnership Project; Technical Specification Group Radio Access Network; Physical layer procedures (FDD) Release 5; 63 pgs.

\* cited by examiner

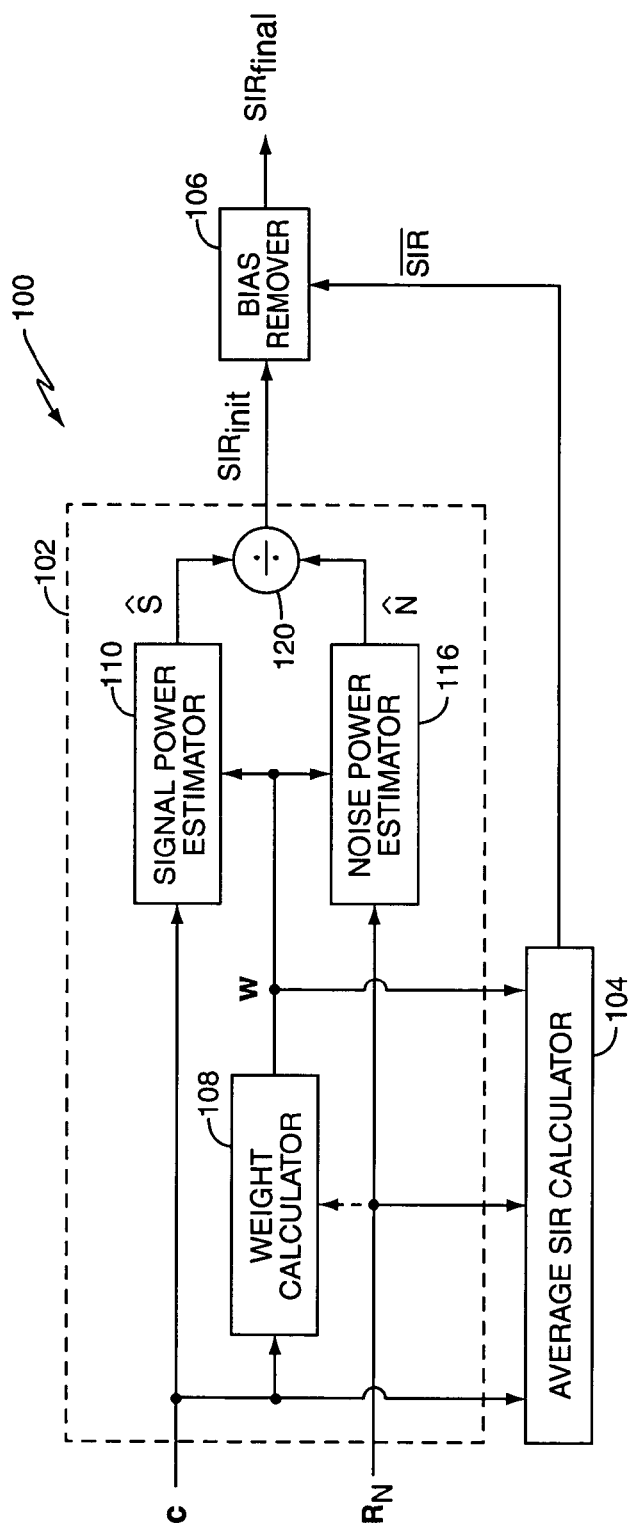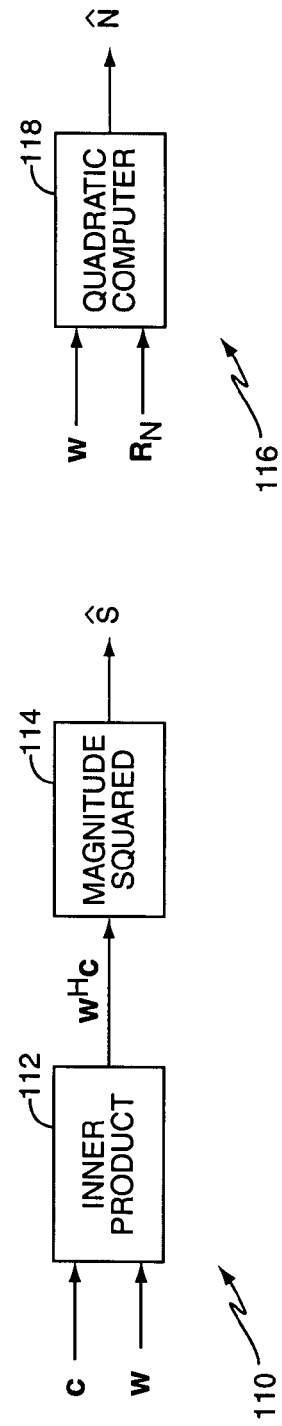

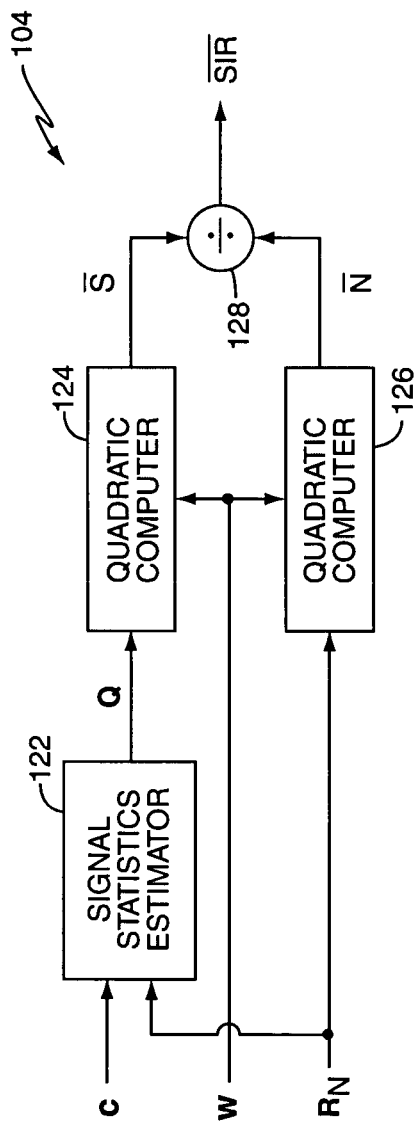
*FIG. 6C*
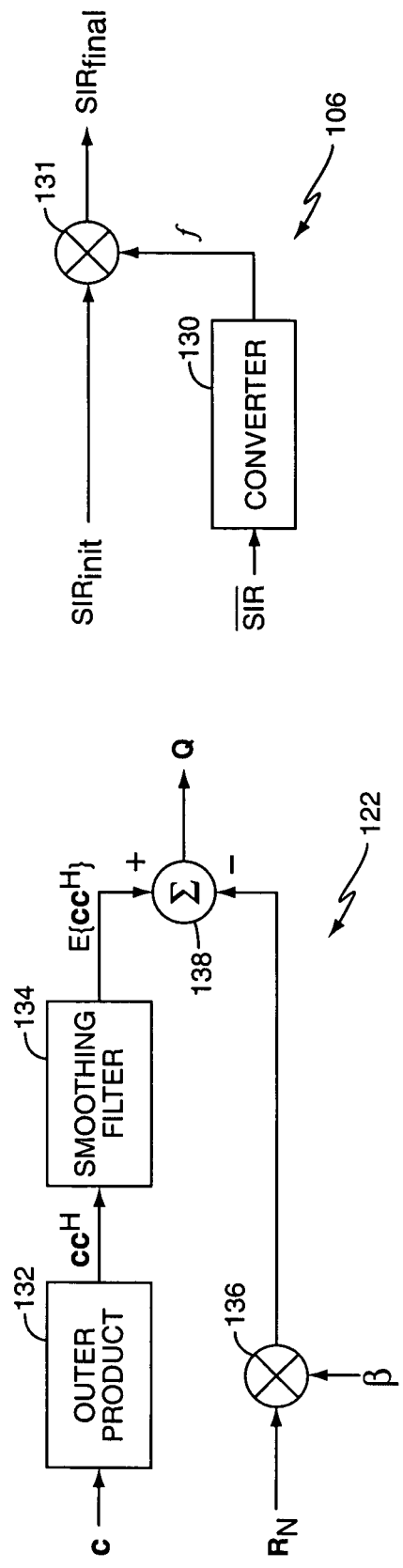
*FIG. 6E*
*FIG. 6D*

SIR ESTIMATION IN A WIRELESS RECEIVER

BACKGROUND OF THE INVENTION

The present invention relates generally to signal processing in a wireless network and more particularly to estimating a signal-to-interference ratio (SIR) in a wireless receiver.

Receivers in wireless networks typically calculate performance parameters to evaluate the receiver and/or to assess certain network level parameters, such as transmit power, data rate, etc. One performance parameter of particular interest to wireless receivers in a spread spectrum network is the signal-to-interference ratio (SIR) associated with the received signals. Conventional receivers typically calculate the SIR associated with the received signals and use the calculated SIR to adapt the network level parameters to current channel conditions. For example, the calculated SIR may be used to control mobile station transmit power, data transmission rate, mobile station scheduling, etc.

The accuracy of network adaptation to current channel conditions depends on the accuracy of the SIR estimates as well as the amount of time expended to generate the SIR estimates. Currently, there are many ways to estimate the SIR in a spread spectrum network. For example, the receiver may use a combination of chip samples and despread symbols to estimate the SIR. While this approach may provide accurate SIR estimates in a timely manner, this approach requires a complex receiver architecture with access to both chip samples and despread values.

Another receiver may use symbol estimates provided by a RAKE receiver output to estimate the SIR. However, because current RAKE output symbols correspond to symbols received well in the past, the resulting SIR does not correspond to current receiver performance and channel conditions. Therefore, while this approach requires a significantly less complex receiver architecture, the resulting SIR estimates are insufficient for real-time operations, such as power control, rate adaptation, etc.

Still other receivers may use despread symbols (pilot or data) to generate a finger SIR for each finger of a RAKE receiver. Summing the finger SIRs provides an SIR estimate that may be used for real-time operations. However, because the despread symbols typically contain a considerable amount of noise, the resulting SIR estimate is often biased. Conventional networks may remove this bias by subtracting an estimate of the bias from the current SIR estimate. However, the bias estimation process can overestimate the bias. As a result, using subtraction to remove the bias can result in negative, and therefore inaccurate, SIR estimates.

SUMMARY OF THE INVENTION

The present invention describes a method and apparatus that removes bias from an initial estimate of signal-to-interference ratio (SIR). In an exemplary embodiment, an SIR processor in an SIR estimator of a wireless receiver comprises an initial SIR calculator, an average SIR calculator, and a bias remover. The initial SIR calculator calculates the initial SIR based on the signal received by the wireless receiver, while the average SIR calculator generates an average SIR. Using the average SIR, the bias remover removes the bias from the initial SIR.

In an exemplary embodiment, the SIR estimator derives despread values from the baseband signal r(t). The SIR estimator uses the despread values to generate channel estimates and noise statistics, which are in turn used by the SIR processor to calculate the initial and average SIR estimates.

Further, according to an exemplary embodiment of the present invention, the bias remover generates a scaling factor based on the average SIR and an offset parameter, where the offset parameter is derived from a count of the despread values processed by the wireless receiver. In this embodiment, the bias remover comprises a converter that generates the scaling factor and a multiplier that multiplies the initial SIR by the scaling factor to remove the bias from the initial SIR.

BRIEF DESCRIPTION OF THE DRAWINGS

FIG. 6 illustrates a block diagram of an exemplary SIR processor for the SIR estimator of FIG. 5.

FIGS. 6A and 6B illustrate block diagrams of exemplary signal and noise power estimators, respectively, for the SIR processor of FIG. 6.

FIG. 6C illustrates a block diagram of an exemplary average SIR calculator for the SIR processor of FIG. 6.

FIG. 6D illustrates a block diagram of an exemplary signal statistics estimator for the average SIR calculator of FIG. 6C.

FIG. 6E illustrates a block diagram of an exemplary bias remover for the SIR processor of FIG. 6.

DETAILED DESCRIPTION OF THE INVENTION

Figure 1:
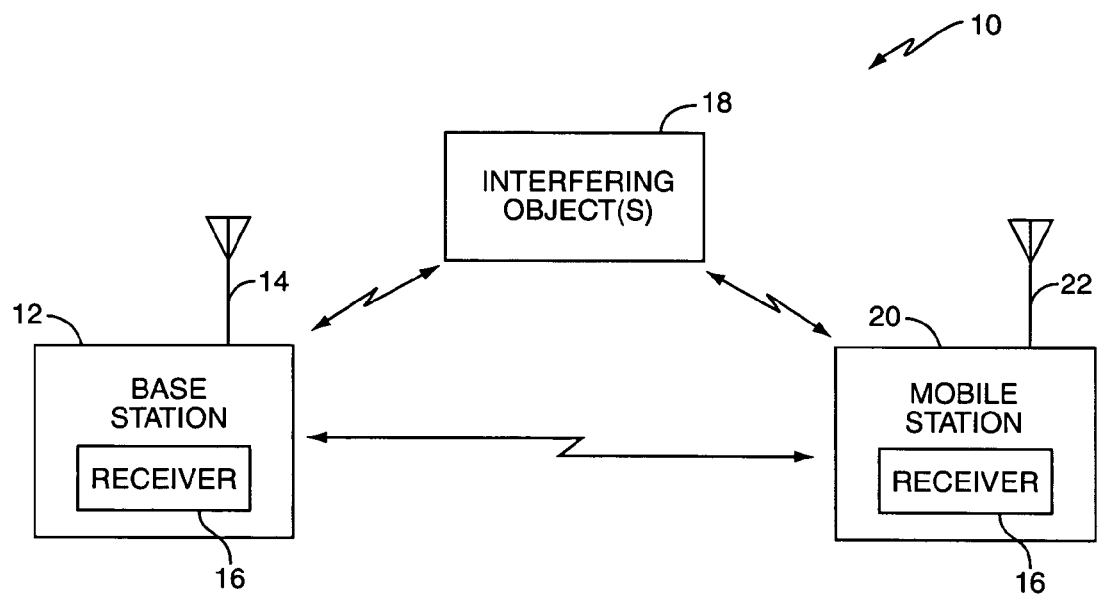
FIG. 1 illustrates an exemplary wireless network.

FIG. 1 illustrates an exemplary spread spectrum wireless communication network 10. The wireless communication network 10 includes at least one base station 12, at least one mobile station 20, and possibly one or more interfering objects 18. As used herein, the term "mobile station" may include a cellular radiotelephone with or without a multi-line display; a Personal Communications System (PCS) terminal that may combine a cellular radiotelephone with data processing, facsimile and data communications capabilities; a personal data assistant (PDA) that can include a radiotelephone, pager, Internet/intranet access, Web browser, organizer, calendar, and/or a global positioning system (GPS) receiver; and a conventional laptop and/or palmtop receiver or other appliance that includes a radiotelephone transceiver. Mobile stations may also be referred to as "pervasive computing" devices.

Base station 12 includes one or more antennas 14 for transmitting/receiving spread spectrum signals with one or more symbols to/from mobile station 20. The transmitted signals typically include traffic and pilot signals. Objects, such as interfering object 18, cause multiple "echoes" or delayed versions of the transmitted symbols to arrive at mobile station 20 at different times. Receiver 16 processes the multiple symbol images at mobile station 20. Similarly, mobile station 20 may transmit symbols via one or more antennas 22 along multiple paths to base station 12, where receiver 16 processes the multiple received symbol images.

Figure 2:
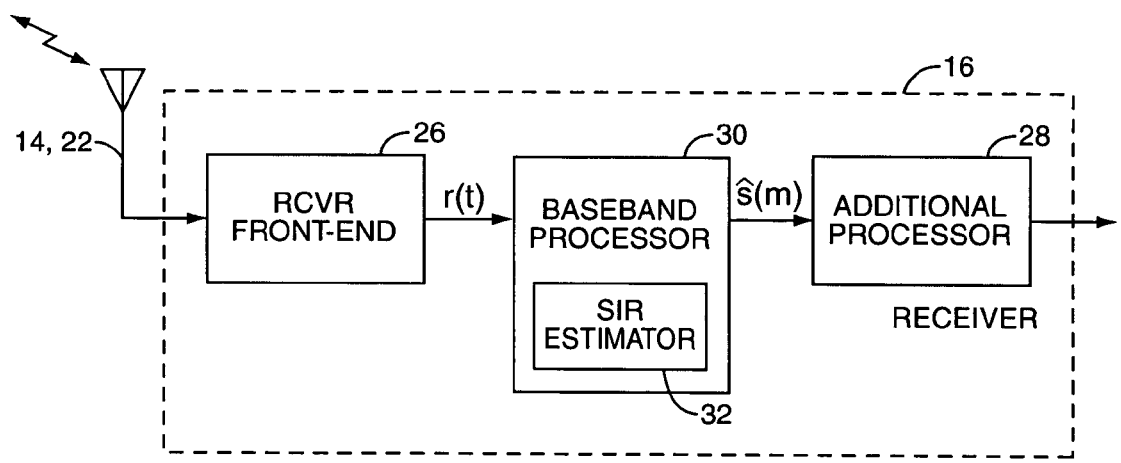
FIG. 2 illustrates an exemplary wireless receiver in the wireless network of FIG. 1.

FIG. 2 illustrates an exemplary receiver 16 for base station 12 and/or mobile station 20. Receiver 16 receives and processes the symbols of the received signals to generate received symbol estimates. An exemplary receiver 16 includes a receiver front end 26, a baseband processor 30, and an additional processor 28. Receiver front end 26 typically includes filters, mixers, and/or conversion circuits, such as analog-to-digital converters, to produce a series of digitized baseband signal samples r(t) corresponding to the received signal. Baseband processor 30 demodulates the baseband signal r(t) to produce symbol estimates ŝ(m) corresponding to the received signal. The symbol estimates ŝ(m) are then processed further, as necessary, in additional processor 28. For example, additional processor 28 may include a turbo decoder (not shown) that determines information bit values based on the symbol estimates provided by the baseband processor 30. These information bit values may then be converted to speech, images, etc.

Figure 3:
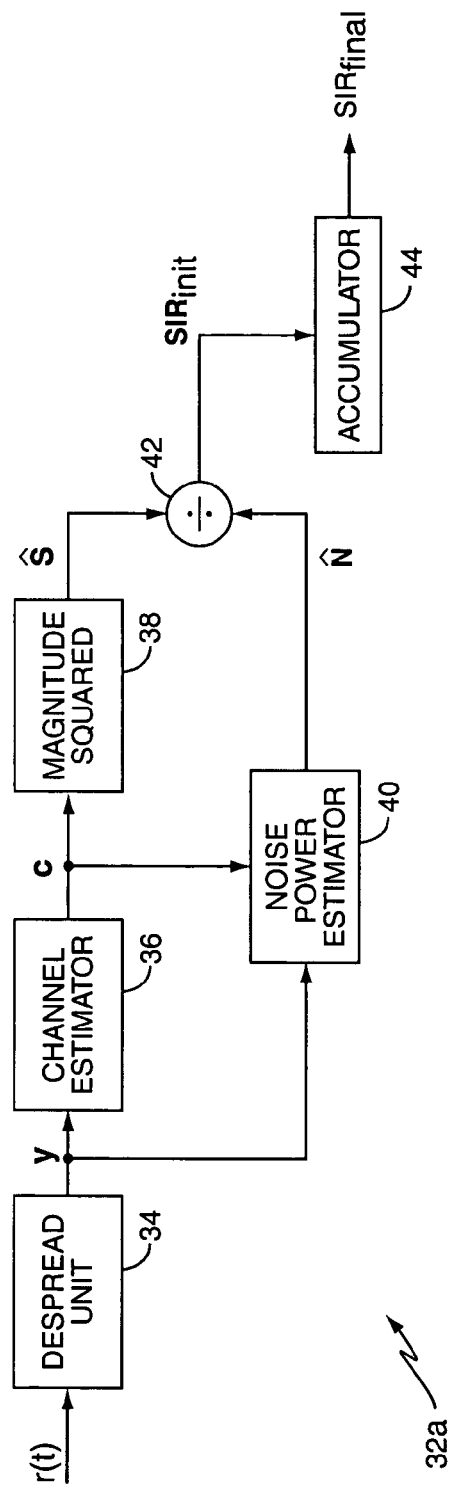
FIG. 3 illustrates a block diagram of an SIR estimator.

As shown in FIG. 2, baseband processor 30 may include a signal-to-interference ratio (SIR) estimator 32 for estimating an SIR from the baseband signal r(t). FIG. 3 illustrates an SIR estimator 32a that includes despread unit 34, channel estimator 36, magnitude squared calculator 38, noise power estimator 40, divider 42, and accumulator 44. Despread unit 34 despreads the received signal to generate a vector of despread symbols or values y. Each element of the vector of despread symbols y corresponds to different timing offsets associated with different signal paths of the multi-path channel. Based on each element of the vector of despread symbols y, channel estimator 36 generates a vector of channel estimates c. Magnitude squared calculator 38 generates a vector of signal power estimates Ŝ based on each element of the vector of channel estimates c. Further, noise power estimator 40 generates a vector of noise power estimates N̂ based on the despread symbols y and the channel estimates c. Divider 42 divides each element in the vector of signal power estimates Ŝ by the corresponding element in the vector of noise power estimates N̂ to generate a vector of initial finger SIR estimates $SIR_{init}$. The elements of the vector of initial finger SIR estimates $SIR_{init}$ are accumulated in accumulator 44 to produce a final SIR estimate $SIR_{final}$ corresponding to the baseband signal r(t). While the SIR estimator 32a of FIG. 3 generates an $SIR_{final}$ appropriate for real-time operations, it does not account for the bias caused by the noisy channel estimates used to generate the $SIR_{final}$.

One way to reduce the bias associated with the SIR estimate is to reduce the noise present in the channel estimates c used to generate the SIR estimate. At low Doppler spreads, this may be accomplished by smoothing the channel estimates c over time. However, time sensitive network operations that rely on accurate SIR estimates often cannot wait the amount of time required to smooth the channel estimates c. As such, this method is not useful for time sensitive operations.

Figure 4:
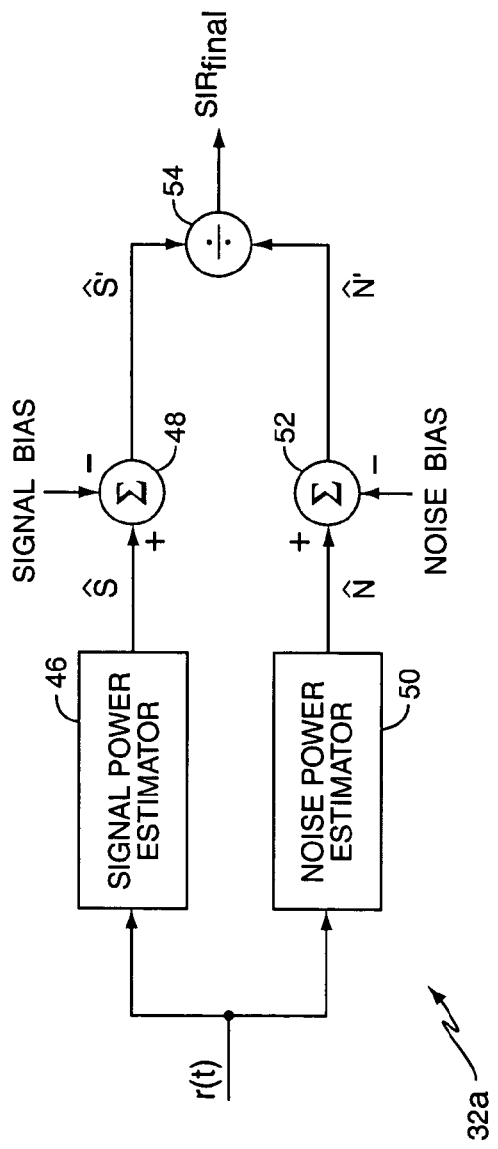
FIG. 4 illustrates a block diagram of another SIR estimator.

Another way to reduce bias is to generate an initial SIR estimate and to remove bias from the initial SIR estimate. WO 01/65717 entitled "Correction of Received Signal and Interference Estimates," incorporated herein by reference, describes an SIR estimator 32 that may be used to remove bias from an initial SIR estimate. FIG. 4 illustrates this SIR estimator 32a. In this embodiment, SIR estimator 32a includes a signal power estimator 46, a signal combiner 48, a noise power estimator 50, a noise combiner 52, and a divider 54. Signal power estimator 46 and noise power estimator 50 generate a signal power estimate Ŝ and noise power estimate N̂, respectively, directly from the baseband signal r(t). However, unlike the SIR estimator 32a of FIG. 3, the SIR estimator 32a of FIG. 4 removes signal bias by subtracting an estimate of the signal bias from the signal power estimate Ŝ in signal combiner 48 to generate a modified signal power estimate Ŝ'. Similarly, noise combiner 52 subtracts an estimate of the noise bias from the noise power estimate N̂ to generate a modified noise power estimate N̂'. Divider 54 divides the modified signal power estimate Ŝ' by the modified noise power estimate N̂' to generate the final SIR estimate ($SIR_{final}$) corresponding to the baseband signal r(t). While this embodiment accounts for the bias, this embodiment is also prone to errors caused by overestimating the signal or noise bias terms, which may result in a negative $SIR_{final}$.

Figure 5:
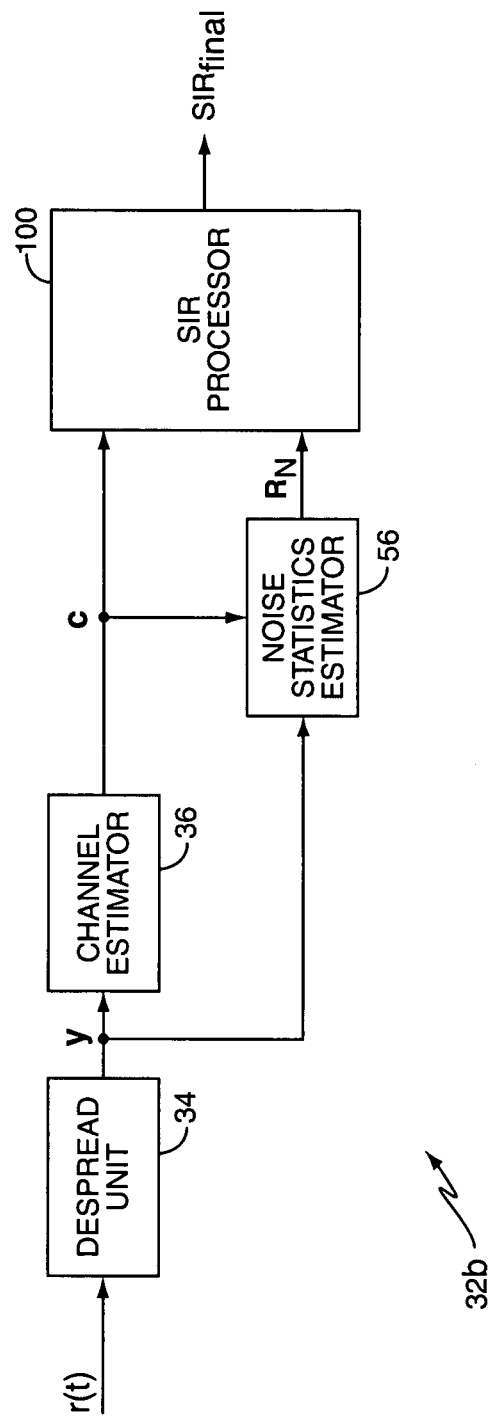
FIG. 5 illustrates a block diagram of an exemplary SIR estimator according to the present invention.

FIG. 5 illustrates a block diagram of an exemplary SIR estimator 32b according to the present invention. SIR estimator 32b provides a final SIR estimate ($SIR_{final}$) that accounts for bias without introducing the subtraction errors caused by past SIR estimation approaches. SIR estimator 32b comprises a despread unit 34, a channel estimator 36, a noise statistics estimator 56, and an SIR processor 100. Despread unit 34 despreads the baseband signal r(t) to generate a vector of despread symbols y. As understood by those skilled in the art, each element of the vector of despread symbols corresponds to different timing offsets associated with different signal paths of the multi-path channel. Based on the despread symbols, channel estimator 36 generates a vector of channel estimates c according to any means known in the art. For example, channel estimate vector c may be derived according to:

$$c = \left(\frac{1}{K}\right)\sum_{i=1}^{K} b^*(i)y(i), \qquad (Eq.\ 1)$$

where K represents the number of pilot symbols processed by the receiver 16, b(i) represents a known pilot symbol for the $i^{th}$ symbol period, b*(i) represents the complex conjugate of b(i), and y(i) represents the vector of despread symbols or values from different path delays for the $i^{th}$ symbol period.

The despread values y, along with the channel estimates c, are also provided to the noise statistics estimator 56. Noise statistics estimator 56 estimates the noise statistics between the despread symbols y from different path delays. The noise statistics may be any statistics that represent the noise elements of the despread symbols y, such as $2^{nd}$ order statistics or correlations between the noise on the despread symbols. Because those skilled in the art will appreciate that "covariance" is a special case of "cross-correlation" with zero mean, the terms "correlation" and "covariance," as used herein, should be understood as interchangeable unless the context of a particular passage makes an explicit distinction between the two terms.

In an exemplary embodiment, noise statistics estimator 56 estimates the correlation matrix M between the impairment on the despread symbols y according to either of Equations 2A or 2B:

$$M = \frac{1}{K-1} \sum_{i=1}^{K} (b^*(i)y(i) - c)(b^*(i)y(i) - c)^H \quad \text{(Eq. 2A)}$$

$$M = \left[ \frac{1}{K-1} \sum_{i=1}^{K} y(i)y^H(i) \right] - \left( \frac{K}{K-1} \right) cc^H, \quad \text{(Eq. 2B)}$$

where superscript "H" denotes the conjugate transpose. A noise statistics matrix, referred to herein as noise correlation matrix $R_N$, may be obtained, for example, by setting $R_N$ equal to M. Alternatively, noise correlation matrix $R_N$ may be obtained by smoothing past M values, using an exponential filter, and then setting $R_N$ equal to the smoothed M. It will be appreciated that because M and $R_N$ are Hermitian symmetric, only the upper or lower triangles of these matrices have to be computed, which greatly simplifies the calculation complexity.

Those skilled in the art will appreciate that the present invention is not limited to the above described noise statistics calculation methods. Indeed, noise correlation matrix $R_N$ may be calculated according to any means known in the art. Exemplary methods are described in U.S. patent application Ser. No. 10/811,699 entitled "Impairment Correlation Estimation in a Spread Spectrum System" and filed 29 Mar. 2004, and U.S. patent application Ser. No. 10/800,167 entitled "Method and Apparatus for Parameter Estimation in a Generalized RAKE Receiver" and filed 12 Mar. 2004, both of which are incorporated herein by reference.

SIR processor 100 derives $SIR_{final}$ from the channel estimates c and the noise correlation matrix $R_N$ as described further below. It will be appreciated that due to the time sensitive nature of SIR estimation for some network operations, channel estimates c refer to values that may be formed using short-term data for the purposes of SIR estimation. Therefore, the SIR estimation channel estimates c may differ from the channel estimates calculated for a demodulator, where time delays are not as critical. As a result, a demodulator (not shown) in baseband processor 30 may use a different channel estimator that generates different channel estimates based on, for example, long-term data. While the present invention describes an SIR processor 100 that uses different channel estimates than those used in the demodulator, it will be appreciated by those skilled in the art that the SIR processor 100 and the demodulator could share channel estimates provided by a single channel estimator to simplify the receiver architecture.

FIG. 6 illustrates an exemplary embodiment of an SIR processor 100 according to the present invention. The SIR processor 100 of FIG. 6 assumes that the noise on the despread symbols y is correlated, which may occur due to dispersive channel interference and/or filters in the receiver front-end 26. SIR processor 100 comprises an initial SIR calculator 102, an average SIR calculator 104, and a bias remover 106. Initial SIR calculator 102 includes a weight calculator 108, a signal power estimator 110, a noise power estimator 116, and a divider 120 for deriving an initial SIR estimate ($SIR_{init}$) based on channel estimates c and noise correlation matrix $R_N$.

To that end, weight calculator 108 calculates a vector of weighting factors w based on the channel estimates c according to any known means. For example, when receiver 16 includes a traditional RAKE receiver, weighting factors w may be approximated according to Equation 3:

$$w = c. \quad \text{(Eq. 3)}$$

However, when receiver 16 includes a generalized RAKE (G-RAKE) receiver, weight calculator 108 may use both the channel estimates c and the noise correlation matrix $R_N$ to calculate the weighting factors w according to:

$$w = R_N^{-1} c. \quad \text{(Eq. 4)}$$

(The interested reader may refer to "A Generalized RAKE Receiver for Interference Suppression" by G. Bottomley, T. Ottosson, and Y.-P. E. Wang, published in IEEE Journal Selected Areas Communications, 18:1536-1545, August 2000 to learn more about G-RAKE receivers). Alternatively, the weighting factors w may be calculated according to other methods, such as those described in U.S. patent application Ser. No. 10/672,127 entitled "Method and Apparatus for RAKE Receiver Combining Weight Generation" filed 26 Sep. 2003, and incorporated herein by reference. According to this method, weighting factors w may be calculated according to:

$$w = Fc, \quad \text{(Eq. 5)}$$

where F depends on channel and noise statistics. In any event, it will be appreciated that, as with the channel estimates, weighting factors w refer to values that may be formed using short-term data for the purposes of SIR estimation. Therefore, the SIR estimation weighting factors w may differ from the weighting factors calculated for a demodulator, where time delays are not as critical. As a result, the SIR processor 100 of the present invention includes a weight calculator 108 that may derive weighting factors w different from those used by the demodulator. However, it will be appreciated by those skilled in the art that the SIR estimator 32b and the demodulator could share weighting factors provided by a single weight calculator to simplify the receiver architecture.

Based on the calculated weighting factors w, initial SIR calculator 102 calculates the signal and noise power estimates used to compute $SIR_{init}$. More particularly, signal power estimator 110 generates an estimate of the overall signal power $\hat{S}$ based on the channel estimates c and the weighting factors w according to any means known in the art. FIG. 6A illustrates an exemplary signal power estimator 110. Signal power estimator 110 includes an inner product calculator 112 and a magnitude squared calculator 114. Magnitude squared calculator 114 squares the magnitude of the inner product of the channel estimates c and the weighting factors w provided by inner product calculator 112 to generate the signal power estimate $\hat{S}$, as shown in Equation 6:

$$\hat{S} = |w^H c|^2. \quad \text{(Eq. 6)}$$

Noise power estimator 116 generates an overall noise power estimate $\hat{N}$ based on the noise correlation matrix $R_N$ and the weighting factors w according to any means known in the art. An exemplary noise power estimator 116 comprising a quadratic computer 118, as illustrated in FIG. 6B, may derive the noise power estimate $\hat{N}$ from the noise correlation matrix $R_N$ and the weighting factors w according to Equation 7:

$$\hat{N} = w^H R_N w. \quad \text{(Eq. 7)}$$

Divider 120 divides the signal power estimate $\hat{S}$ by the noise power estimate $\hat{N}$ to generate the initial SIR estimate $SIR_{init}$. Bias remover 106 further refines $SIR_{init}$ by removing bias from $SIR_{init}$ using an average SIR estimate ($\overline{SIR}$) generated by average SIR calculator 104. In a preferred embodiment, bias remover 106 comprises a multiplier that multiplies the initial SIR estimate $SIR_{init}$ by a scaling factor f derived from the average SIR estimate $\overline{SIR}$. By multiplying $SIR_{init}$ by an average SIR based scaling factor f, bias remover 106 removes bias from the initial SIR estimate $SIR_{init}$ to generate the final SIR estimate $SIR_{final}$.

FIG. 6C illustrates an exemplary average SIR calculator 104 for the SIR processor 100 of FIG. 6. Average SIR calculator 104 includes a signal statistics estimator 122, a signal quadratic computer 124, a noise quadratic computer 126, and a divider 128. While FIG. 6C illustrates separate quadratic computers 124, 126 for calculating the average signal and noise powers, respectively, those skilled in the art will appreciate that these quadratic computers 124, 126 may be combined into a single quadratic computer that calculates both of the average signal and noise powers.

Signal statistics estimator 122 calculates a signal correlation matrix Q based on the channel estimates c and the noise correlation matrix $R_N$. An exemplary signal statistics estimator 122 is shown in FIG. 6D. Signal statistics estimator 122 comprises an outer product calculator 132, a smoothing filter 134, a multiplier 136, and a combiner 138. Smoothing filter 134 smoothes the outer product of the channel estimates c, provided by outer product calculator 132, over time to generate a channel estimate correlation matrix P shown in Equation 8:

$$P = E\{cc^H\}, \qquad (Eq. 8)$$

where $E\{\ \}$ denotes the expected value. It will be appreciated that because P is Hermitian symmetric, only the upper or the lower triangles of the channel estimate correlation matrix have to be computed, which can greatly simplify the calculation complexity of the present invention.

Because the channel estimates c include noise due to estimation error, channel estimate correlation matrix P represents a biased estimate of the signal correlation matrix Q. Therefore, to remove the bias, signal statistics estimator 122 subtracts a scaled version of the noise correlation matrix, provided by multiplier 136, in combiner 138 to generate the signal correlation matrix Q, as shown in Equation 9:

$$Q = P - \beta R_N = P - \frac{1}{K} R_N, \qquad (Eq. 9)$$

where $\beta$ depends on the number (K) of despread symbols used to estimate the vector of channel estimates c. K may also include relative power or energy levels between pilot and traffic data. When K is large, or when there is interest in simplifying operations, Q may be set equal to P.

Signal statistics estimator 122 provides signal correlation matrix Q to signal quadratic computer 124, which calculates an average signal power $\bar{S}$ according to Equation 10:

$$\bar{S} = w^H Q w. \qquad (Eq. 10)$$

Similarly, noise quadratic computer 126 uses noise correlation matrix $R_N$ to calculate an average noise power $\bar{N}$ according to Equation 11:

$$\bar{N} = w^H R_N w. \qquad (Eq. 11)$$

Divider 128 generates the average SIR ($\overline{SIR}$) by dividing the average signal power $\bar{S}$ by the average noise power $\bar{N}$.

FIG. 6E illustrates an exemplary bias remover 106 for the SIR processor 100 of FIG. 6. Bias remover 106 includes a converter 130 and a multiplier 131. Converter 130 derives a scaling factor f from the average SIR estimate $\overline{SIR}$ provided by the output of average SIR calculator 104 according to:

$$f = \frac{\overline{SIR}}{\overline{SIR} + \alpha}, \qquad (Eq. 12)$$

where $\alpha$ represents an offset parameter derived from the number (K) of despread symbols used to generate the channel estimates c. K may also include relative power or energy levels between pilot and traffic data. In a preferred embodiment, the offset parameter $\alpha$ may be calculated according to $\alpha = 1/K$. Multiplier 131 removes bias from the initial SIR estimate $SIR_{init}$ and generates the final SIR estimate $SIR_{final}$ by scaling the initial SIR estimate $SIR_{init}$ using the scaling factor f provide by converter 130.

Figure 7:
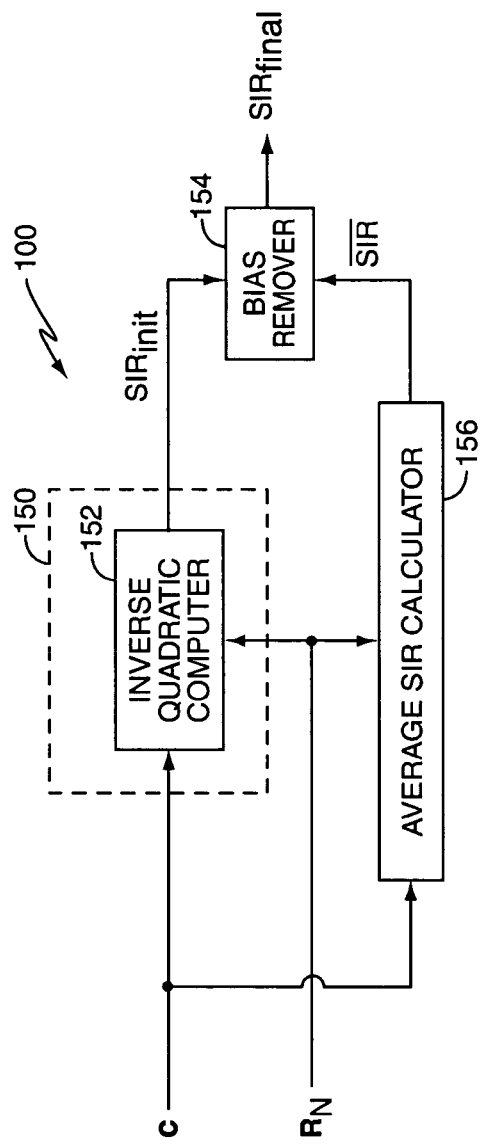
FIG. 7 illustrates a block diagram of another exemplary SIR processor for the SIR estimator of FIG. 5.

Turning now to FIG. 7, another embodiment of an exemplary SIR processor 100 will be described. Like the SIR processor 100 of FIG. 6, the SIR processor 100 of FIG. 7 comprises an initial SIR calculator 150, a bias remover 154, and an average SIR calculator 156. For this embodiment, it is assumed that a G-RAKE receiver is used, where the weighting factors are calculated according to Equation 4. Therefore the initial SIR calculator 150 can use an inverse quadratic computer 152 to calculate the initial SIR estimate $SIR_{init}$ according to:

$$SIR_{init} = c^H R_N^{-1} c. \qquad (Eq. 13)$$

Note: those skilled in the art will appreciate that there are many ways to simplify the above calculation. For example, Gauss-Seidel may be used to obtain $R_N^{-1} c$ first.

Figure 7A:
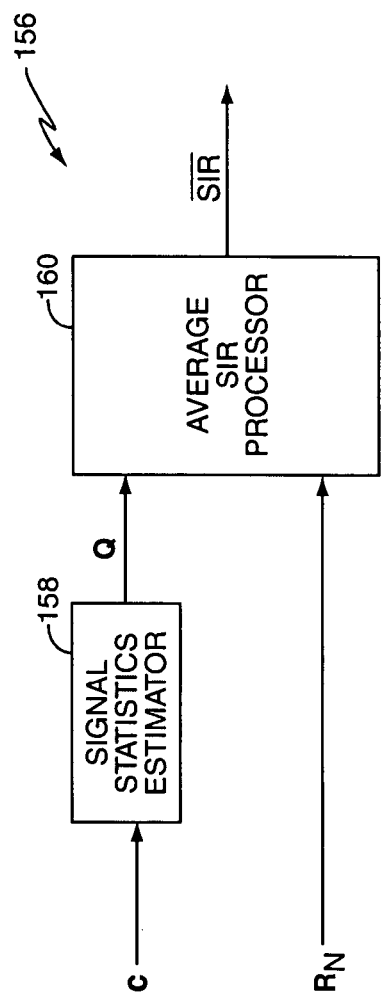
FIG. 7A illustrates a block diagram of an exemplary average SIR calculator for the SIR processor of FIG. 7.

As with the first embodiment, bias remover 154 uses an average SIR estimate $\overline{SIR}$ provided by average SIR calculator 156 to remove bias from $SIR_{init}$. FIG. 7A illustrates an exemplary average SIR calculator 156 for the SIR processor 100 shown in FIG. 7. Average SIR calculator 156 comprises a signal statistics estimator 158, which generates a signal correlation matrix Q as described above. Average SIR calculator 156 further comprises an average SIR processor 160 that uses the signal correlation matrix Q and the noise correlation matrix $R_N$ to calculate an average SIR estimate $\overline{SIR}$ according to:

$$\overline{SIR} = Tr\{R_N^{-1} Q\}, \qquad (Eq. 14)$$

where $Tr\{\ \}$ denotes the Trace of the product of $R_N^{-1}$ and Q. The Trace of a matrix may be computed in any of a number of ways. For example, one way to compute the Trace of the product of $R_N^{-1}$ and Q is to solve for the columns of the product by solving:

$$R_N y = q, \qquad (Eq. 15)$$

where q is a column of Q. Equation 15 may be solved using the Gauss-Seidel or Gauss-Jordan iterative approach, for example.

Another way to solve Equation 15, and therefore to approximate the Trace of the product of $R_N^{-1}$ and Q, is to assume that the noise correlation matrix $R_N$ and the signal correlation matrix Q are diagonal. This may be established by ignoring the off-diagonal elements of $R_N$ and Q and/or setting the off-diagonal elements to zero. In either case, the average SIR estimate $\overline{SIR}$ may be approximated as the sum of the delay path SIR values, where the delay path SIR values are obtained by dividing the diagonal elements of Q (delay path signal powers) by the diagonal elements of $R_N$ (delay path noise powers), as shown in Equation 16:

$$\overline{SIR} = Tr\{R_N^{-1}Q\} \cong \sum_{i=1}^{J} \frac{Q(i,i)}{R_N(i,i)}, \quad \text{(Eq. 16)}$$

wherein J represents the number of delay paths processed by the receiver. Because the off-diagonal elements are ignored (or set to zero), the off-diagonal elements of Q do not need to be calculated, which saves processing time. This approach for estimating $\overline{SIR}$ is particularly effective when the baseband processor includes a traditional RAKE receiver and the noise present in the different despread symbols is uncorrelated. It will be appreciated that the assumption that the noise correlation matrix $R_N$ is diagonal also simplifies the $SIR_{init}$ calculation. As a result, Equation 13 may be approximated as the sum of the delay path SIR values, where each finger has its own average signal and noise power.

Still another way to approximate the Trace of the product of $R_N^{-1}$ and Q is to assume that the noise correlation matrix $R_N$ is diagonal and that the noise associated with each delay path processed by the receiver is stationary noise, and therefore, has the same noise power N. As a result, the diagonal elements of the noise correlation matrix $R_N$ are equivalent. Therefore, $\overline{SIR}$ may be computed according to:

$$\overline{SIR} = Tr\{R_N^{-1}Q\} \cong \frac{1}{N}\sum_{i=1}^{J} Q(i,i), \quad \text{(Eq. 17)}$$

where J represents the number of fingers or delay paths processed by the receiver. It will be appreciated that the assumption that the noise correlation matrix $R_N$ is diagonal also simplifies the $SIR_{init}$ calculation. As a result, Equation 13 simplifies to the sum of the finger signal power values divided by the noise power N.

Once $\overline{SIR}$ is calculated, bias remover 154 removes bias from the initial SIR estimate $SIR_{init}$ using the average SIR estimate $\overline{SIR}$. In an exemplary embodiment, bias remover 154 comprises a multiplier that multiplies $SIR_{init}$ by a scaling factor f derived from $\overline{SIR}$. For this embodiment, bias remover 154 may compute the $\overline{SIR}$ based scaling factor f in converter 130 of FIG. 6E according to:

$$f = \frac{\overline{SIR}}{\overline{SIR}+\alpha}, \quad \text{(Eq. 18)}$$

where α is an offset parameter that may be calculated according to α=J/K, where J represents the number of delay paths processed by the receiver and K represents the number of symbols used to calculate the channel estimates c.

Figure 8:
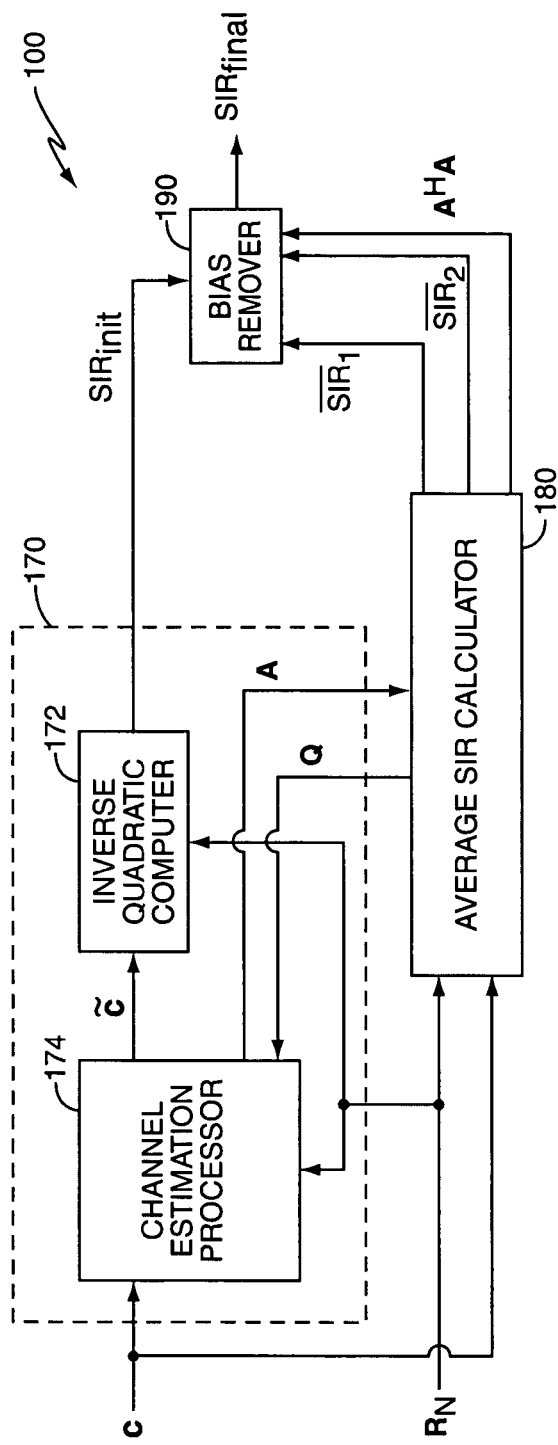
FIG. 8 illustrates a block diagram of another exemplary SIR processor for the SIR estimator of FIG. 5.

FIG. 8 illustrates still another exemplary embodiment of an SIR processor 100. This embodiment uses an approximate form of joint scaling, which is an extension of G-RAKE used to account for noisy channel estimates when forming combining weights. As with the previous embodiments, the SIR processor 100 of FIG. 8 also includes an initial SIR calculator 170, an average SIR calculator 180, and a bias remover 190. However, in this embodiment, initial SIR calculator 170 refines the channel estimates c before calculating $SIR_{init}$.

Figure 8A:
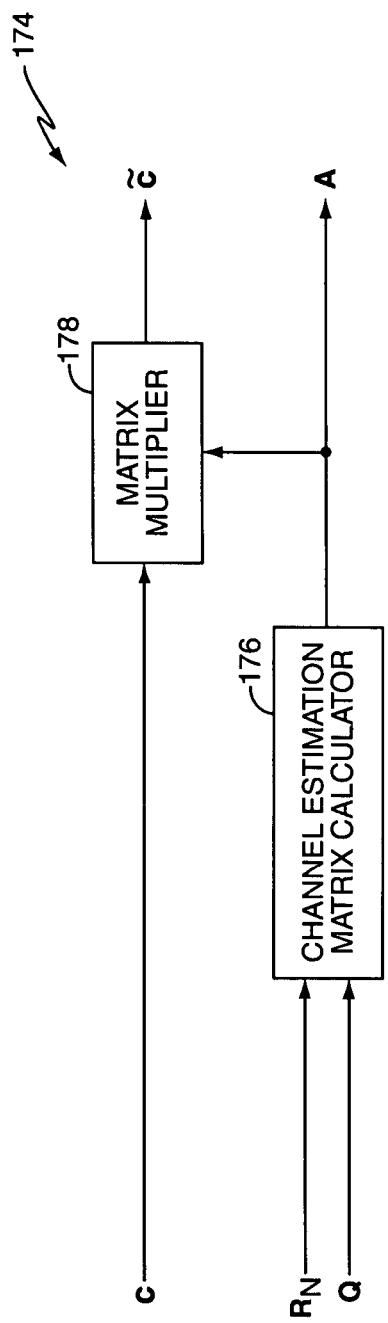
FIG. 8A illustrates a block diagram of an exemplary channel estimation processor for the SIR processor of FIG. 8.

To that end, initial SIR calculator 170 comprises a channel estimation processor 174 and an inverse quadratic computer 172. Channel estimation processor 174, shown in FIG. 8A, includes a channel estimation matrix calculator 176 and a matrix multiplier 178. Channel estimation matrix calculator 176 computes a channel estimation matrix A according to:

$$A = Q\left(Q + \frac{1}{K}R_N\right)^{-1}, \quad \text{(Eq. 19)}$$

where K represents the number of despread symbols used to calculate the channel estimates c and may also include the effects of power level differences between pilot and traffic data. Because channel estimation matrix A depends on the signal statistics Q and the noise statistics $R_N$, as shown in Equation 19, channel estimation matrix A provides a form of MMSE (Minimum Mean Square Error) channel estimation.

Channel estimation processor 174 refines the original channel estimates c by applying the channel estimation matrix A to the channel estimates c in matrix multiplier 178 to generate the modified channel estimates c̃. Initial SIR calculator 170 then calculates the initial SIR estimate $SIR_{init}$ in inverse quadratic computer 172 using the modified channel estimates c̃, as shown in Equation 20:

$$SIR_{init} = \tilde{c}^H R_N^{-1} \tilde{c}. \quad \text{(Eq. 20)}$$

As shown by Equation 20, the embodiment of FIG. 8 is similar to the embodiment of FIG. 7. The primary difference is the modification of the channel estimates c by channel estimation matrix A that produces the modified channel estimates c̃.

Figure 8B:
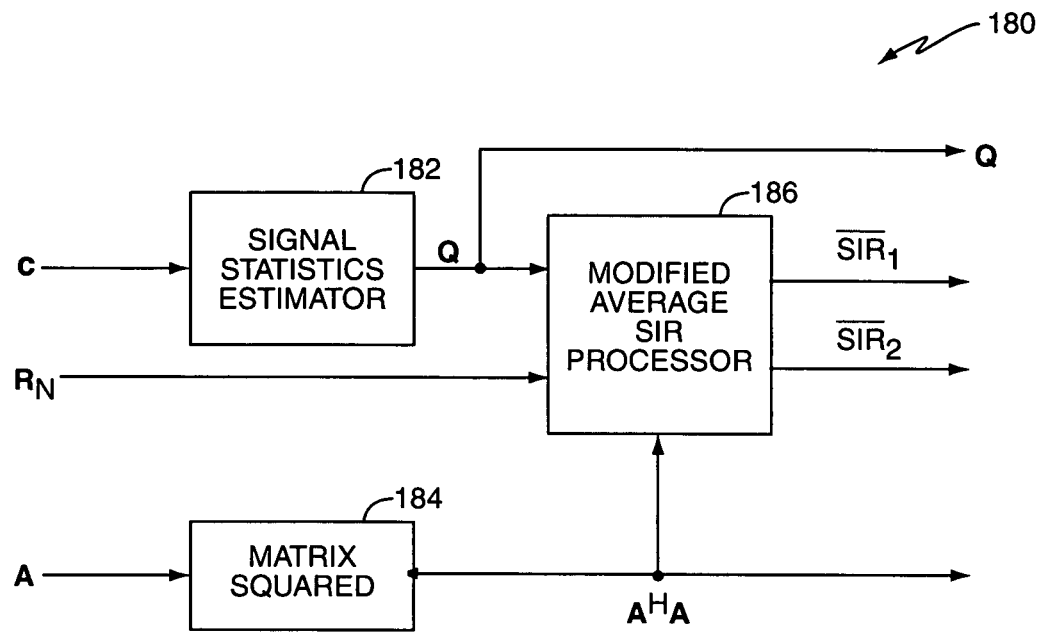
FIG. 8B illustrates a block diagram of an exemplary average SIR calculator for the SIR processor of FIG. 8.

Further, channel estimation matrix A also modifies the average SIR estimate $\overline{SIR}$. FIG. 8B illustrates an exemplary average SIR calculator 180 for the SIR processor 100 of FIG. 8. As with the average SIR calculator 156 of FIG. 7A, average SIR calculator 180 of FIG. 8B comprises a signal statistics estimator 182. In addition, average SIR calculator 180 includes a matrix squared calculator 184 and a modified average SIR processor 186 that replaces the average SIR processor 160 of FIG. 7A. In the embodiment of FIG. 8B, modified average SIR processor 186 computes two average SIR estimates, $\overline{SIR}_1$ and $\overline{SIR}_2$. The first average SIR estimate $\overline{SIR}_1$ is calculated according to Equation 14, which is repeated here as Equation 21:

$$\overline{SIR}_1 = Tr\{R_N^{-1}Q\}. \quad \text{(Eq. 21)}$$

The second average SIR estimate $\overline{SIR}_2$ is derived from the square of the channel estimation matrix A provided by matrix squared calculator 184, as well as the signal correlation matrix Q and the noise correlation matrix $R_N$, as shown by Equation 22:

$$\overline{SIR}_2 = Tr\{A^H A R_N^{-1} Q\}. \quad \text{(Eq. 22)}$$

As shown in Equation 22, $\overline{SIR}_2$ essentially has a scaling down factor that depends on the channel estimation matrix A, which intuitively accounts for the noise in the channel estimates c.

Figure 8C:
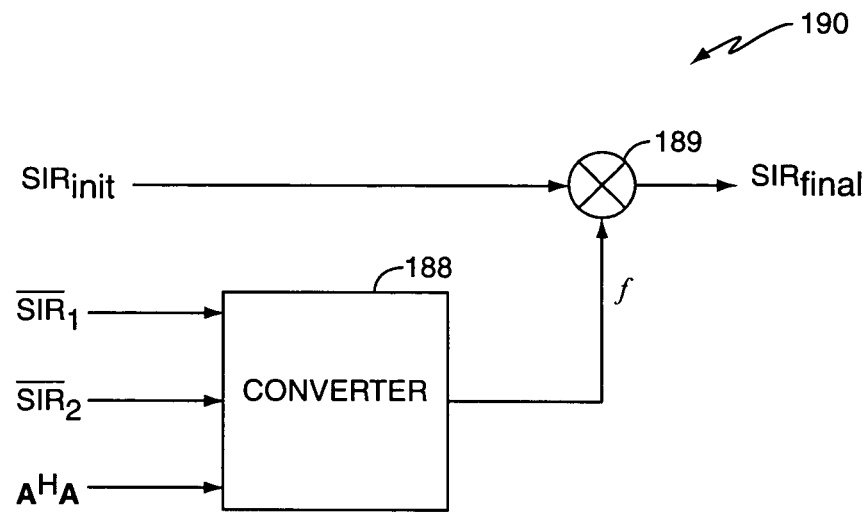
FIG. 8C illustrates a block diagram of an exemplary bias remover for the SIR processor of FIG. 8.

FIG. 8C illustrates an exemplary bias remover 190 for the SIR processor 100 of FIG. 8 that removes bias from $SIR_{init}$ using $\overline{SIR}_1$ and $\overline{SIR}_2$. Bias remover 190 includes a converter 188 and a multiplier 189. Using the $\overline{SIR}_1$ and $\overline{SIR}_2$ provided by average SIR calculator 180, converter 188 may compute a scaling factor f according to:

$$f = \frac{\overline{SIR}}{\overline{SIR}_2+\alpha}, \quad \text{(Eq. 23)}$$

where $\alpha$ may be calculated as $\alpha=(1/K)\text{Tr}\{A^H A\}$. In some embodiments it may be desirable to simplify the computations associated with $\overline{\text{SIR}}_1$ and $\overline{\text{SIR}}_2$. To that end, $A^H A$ may be approximated as the identity matrix, and $\overline{\text{SIR}}_1$ and $\overline{\text{SIR}}_2$ may be computed according to the methods described above with reference to FIG. 7. In any event, multiplier 189 removes bias from the $\text{SIR}_{init}$ to generate the final SIR estimate $\text{SIR}_{final}$ by scaling the initial SIR estimate $\text{SIR}_{init}$ using the scaling factor f provided by converter 188.

Figure 9:
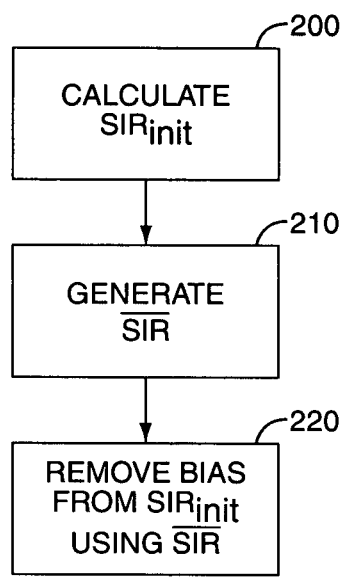
FIG. 9 illustrates an exemplary flow chart for the method of the present invention.

The above describes a method and an apparatus for removing bias from an initial SIR estimate $\text{SIR}_{init}$ to calculate a final SIR estimate $\text{SIR}_{final}$. FIG. 9 shows an exemplary method for implementing the present invention. According to the present invention, the SIR processor 100 calculates an initial SIR estimate $\text{SIR}_{init}$ based on the received signal (Block 200). Further, SIR processor 100 generates an average SIR estimate $\overline{\text{SIR}}$ based on the received signal (Block 210). Using the average SIR estimate $\overline{\text{SIR}}$, SIR processor 100 removes bias from the initial SIR estimate $\text{SIR}_{init}$ to generate the final SIR estimate $\text{SIR}_{final}$ (Block 220).

While the SIR processor 100 of the present invention is shown having various separate components, those skilled in the art will appreciate that two or more of these components may be combined into the same functional circuit. Further, those skilled in the art will appreciate that one or more of these circuits may be embodied in hardware and/or software (including firmware, software, micro-code, etc.), including an application specific integrated circuit (ASIC), field programmable gate array (FPGA), etc. Software or code to implement the present invention may be stored in any known computer readable medium.

As shown in FIGS. 6-8 and in the above description, a scaling factor f may be derived from the average SIR estimate $\overline{\text{SIR}}$, that in turn is derived from the baseband signal r(t). As a result, the SIR processor 100 of the present invention removes bias present in $\text{SIR}_{init}$ using the average SIR estimate $\overline{\text{SIR}}$. While the above describes several ways to calculate $\overline{\text{SIR}}$, the present invention is not limited to these methods. For example, $\overline{\text{SIR}}$ may be approximated by smoothing past final SIR values. Further, it will be appreciated that a target SIR used in a power control loop, a nominal SIR, or a worst case SIR may be defined as the $\overline{\text{SIR}}$ and used to calculate the scaling factor f.

Because the above described method and apparatus may compute $\text{SIR}_{final}$ relatively instantaneously, the resulting final SIR estimate $\text{SIR}_{final}$ may be used in real-time operations, such as power control, rate adaptation, etc. Further, unlike past solutions, the present invention may avoid the problem of a negative final SIR estimate $\text{SIR}_{final}$ by multiplying the initial SIR estimate $\text{SIR}_{init}$ by a scaling factor f to remove bias. Preliminary tests have shown that the multiplicative approach of the present invention, as compared to the conventional subtractive approach, may improve the accuracy of a final SIR estimate by 20% for a standard RAKE receiver. The accuracy improvements are even greater (40%-70%) in receivers that use a grid approach to finger placement, as described in U.S. patent application Ser. No. 10/653,679 and entitled "Method and Apparatus for Finger Placement in a DS-CDMA RAKE Receiver," filed 2 Sep. 2003. As a result, the present invention describes an improved method and apparatus for providing accurate final SIR estimates for time sensitive operations.

While the above describes calculating a final SIR estimate $\text{SIR}_{final}$ for real-time operations, it will be appreciated by those skilled in the art that the final SIR estimate may also be used to determine a long term SIR. For example, final SIR estimates computed over one or more frames may be averaged to generate a long-term SIR estimate. This long-term SIR estimate may be provided to a base station or other network entity as a long-term quality measure. Further, once this long-term SIR estimate is computed, SIR processor 100 may use the long-term SIR estimate as the average SIR estimate used to calculate the scaling factor f.

The above also describes the invention in terms of despread symbols y derived from the baseband signal r(t). It will be appreciated by those skilled in the art that these despread symbols may be based on pilot symbols, data symbols, and/or a pilot channel that is treated as a continuous series of pilot symbols. Further still, the number of symbols and/or the type of symbols may be selectively changed based on the current channel conditions. For example, a Doppler spread estimator may be used to determine how quickly a channel is changing. If the channel is changing rapidly, only the symbols from a single time slot, for example, may be used. If the channel is changing slowly, then symbols from multiple past slots may be used. For the slowly changing channels, channel estimator 36 and/or noise statistics estimator 56 may exponentially weight the contributions from older slots and/or compensate each slot for changes in the transmit power due to power control.

While the above wireless network was described in terms of a single transmit and/or receive antenna, the present invention is not so limiting and may be applied to networks with multiple transmit and/or receive antennas. In this case, fingers of the spread spectrum receiver are assigned to certain paths from certain antennas. Therefore, vector quantities, such as the despread symbols, channel estimates, etc., may still be collected into vectors. However, for the multiple transmit/receive antenna system, the elements in the vectors have both a path and an antenna index. For example, when there are two receive antennas, where each antenna receives signals from two different paths, the vector quantities are of length four and the matrices are of size 4×4. Further, for the multiple transmit antenna system in which different scrambled spreading codes are used on the different transmit antennas, it is typically reasonable to assume that noise and fading terms are uncorrelated. As a result, SIR processor 100 may separately generate an initial SIR estimate for each transmitted signal and then sum the individual initial SIR estimates to obtain an overall initial SIR estimate $\text{SIR}_{init}$. In this scenario, bias removal may occur either before or after the summation. It will also be appreciated that the present invention may be used with transmit diversity systems.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of removing bias from an initial signal-to-interference ratio generated by a wireless receiver comprising:

calculating the initial signal-to-interference ratio based on a signal received by the wireless receiver;

generating an average signal-to-interference ratio by calculating a signal correlation matrix based on channel estimates derived from the received signal, and calculating the average signal-to-interference ratio based on the signal correlation matrix and noise statistics derived from the received signal;

calculating a scaling factor based on the average signal-to-interference ratio according to:

$$f = \frac{\overline{SIR}}{\overline{SIR} + \alpha}$$

where $\overline{SIR}$ represents the average signal-to-interference ratio and $\alpha$ represents an offset parameter; and multiplying the initial signal-to-interference ratio by the scaling factor to remove the bias from the initial signal-to-interference ratio.

2. The method of claim 1 wherein calculating the average signal-to-interference ratio based on channel estimates and noise statistics derived from the received signal comprises calculating the average signal-to-interference ratio based on channel estimates and noise statistics derived from despread values of the received signal.

3. The method of claim 1 wherein the offset parameter is derived from at least one of a count of despread values processed by the wireless receiver to generate the channel estimates and a count of the paths of a multi-path channel processed by the wireless receiver.

4. The method of claim 1 wherein calculating the average signal-to-interference ratio based on the signal correlation matrix and the noise statistics comprises:
 calculating weighting factors based on the channel estimates;
 calculating an average signal power based on the signal correlation matrix and the weighting factors;
 calculating an average noise power based on the noise statistics and the weighting factors; and
 calculating the average signal-to-interference ratio based on the average signal power and the average noise power.

5. The method of claim 4 wherein the offset parameter is derived from at least one of a count of despread values processed by the wireless receiver to generate the channel estimates and a count of the paths of the multi-path channel processed by the wireless receiver.

6. The method of claim 1 wherein calculating the initial signal-to-interference ratio based on the received signal comprises calculating the initial signal-to-interference ratio based on the channel estimates and the noise statistics derived from the received signal.

7. The method of claim 6 wherein calculating the initial signal-to-interference ratio based on the channel estimates and the noise statistics comprises:
 calculating weighting factors based on the channel estimates;
 generating a signal power estimate based on the weighting factors;
 generating a noise power estimate based on the weighting factors; and
 calculating the initial signal-to-interference ratio based on the generated signal and noise power estimates.

8. The method of claim 6 wherein calculating the initial signal-to-interference ratio based on the channel estimates and the noise statistics comprises combining the channel estimates and the noise statistics in an inverse quadratic computer to calculate the initial signal-to-interference ratio.

9. The method of claim 8 wherein calculating the initial signal-to-interference ratio further comprises:
 calculating a channel estimation matrix based on the signal correlation matrix and the noise statistics; and
 calculating modified channel estimates based on the channel estimation matrix;
 wherein combining the channel estimates and the noise statistics in the inverse quadratic computer comprises combining the modified channel estimates and the noise statistics in the inverse quadratic computer to calculate the initial signal-to-interference ratio.

10. The method of claim 1 wherein generating the average signal-to-interference ratio further comprises smoothing past signal-to-interference values associated with the wireless receiver.

11. A method of removing bias from an initial signal-to-interference ratio generated by a wireless receiver comprising:
 calculating the initial signal-to-interference ratio based on a signal received by the wireless receiver;
 generating an average signal-to-interference ratio by calculating a signal correlation matrix based on channel estimates derived from the received signal, and calculating the average signal-to-interference ratio based on the signal correlation matrix and noise statistics derived from the received signal;
 calculating a scaling factor based on the average signal-to-interference ratio based on the average signal-to-interference ratio as modified by an offset parameter;
 multiplying the initial signal-to-interference ratio by the scaling factor to remove the bias from the initial signal-to-interference ratio;
 calculating a channel estimation matrix based on the noise statistics and the signal correlation matrix; and
 calculating a different average signal-to-interference ratio based on the channel estimation matrix;
 wherein calculating the scaling factor based on the average signal-to-interference ratio comprises processing both average signal-to-interference ratios to calculate the scaling factor.

12. The method of claim 11 wherein processing both average signal-to-interference ratios to calculate the scaling factor comprises calculating the scaling factor according to:

$$f = \frac{\overline{SIR}_1}{\overline{SIR}_2 + \alpha}$$

where $\overline{SIR}_1$ represents the average signal-to-interference ratio, $\overline{SIR}_2$ represents the different signal-to-interference ratio, and $\alpha$ represents the offset parameter.

13. The method of claim 12 wherein the offset parameter is derived from at least one of the channel estimation matrix and a count of despread values processed by the wireless receiver to generate the channel estimates.

14. The method of claim 11 wherein calculating the initial signal-to-interference ratio based on the received signal comprises calculating the initial signal-to-interference ratio based on the channel estimates and the noise statistics derived from the received signal.

15. The method of claim 14 wherein calculating the initial signal-to-interference ratio based on the channel estimates and the noise statistics comprises:
 calculating weighting factors based on the channel estimates;
 generating a signal power estimate based on the weighting factors;
 generating a noise power estimate based on the weighting factors; and
 calculating the initial signal-to-interference ratio based on the generated signal and noise power estimates.

16. The method of claim 14 wherein calculating the initial signal-to-interference ratio based on the channel estimates and the noise statistics comprises combining the channel estimates and the noise statistics in an inverse quadratic computer to calculate the initial signal-to-interference ratio.

17. The method of claim 16 wherein calculating the initial signal-to-interference ratio further comprises:
calculating a channel estimation matrix based on the signal correlation matrix and the noise statistics; and
calculating modified channel estimates based on the channel estimation matrix;
wherein combining the channel estimates and the noise statistics in the inverse quadratic computer comprises combining the modified channel estimates and the noise statistics in the inverse quadratic computer to calculate the initial signal-to-interference ratio.

18. The method of claim 11 wherein generating the average signal-to-interference ratio further comprises smoothing past signal-to-interference values associated with the wireless receiver.

19. A signal-to-interference ratio processor in a wireless receiver for removing bias from an initial signal-to-interference ratio, the signal-to-interference ratio processor comprising:
an initial signal-to-interference ratio calculator to calculate the initial signal-to-interference ratio based on a signal received by the wireless receiver;
an average signal-to-interference ratio calculator to generate an average signal-to-interference ratio, said average signal-to-interference ratio calculator comprising:
a signal statistics estimator to estimate a signal correlation matrix based on the channel estimates; and
an average signal-to-interference ratio estimator to calculate the average signal-to-interference ratio based on the signal correlation matrix and the noise statistics; and
a bias remover comprising:
a converter to calculate a scaling factor by modifying the average signal-to-interference ratio by an offset parameter derived from at least one of a count of despread values processed by the wireless receiver and a count of delay paths in a multi-path channel processed by the wireless receiver; and
a multiplier to multiply the initial signal-to-interference ratio by the scaling factor to remove the bias from the initial signal-to-interference ratio.

20. The signal-to-interference ratio processor of claim 19 wherein the average signal-to-interference ratio calculator generates the average signal-to-interference ratio based on channel estimates and noise statistics derived from the received signal.

21. The signal-to-interference ratio processor of claim 20 wherein the average signal to interference ratio calculator derives the channel estimates and the noise statistics from despread values derived from the received signal.

22. The signal-to-interference ratio processor of claim 19 wherein the average signal-to-interference ratio estimator comprises at least one quadratic computer to calculate an average signal power based on the channel estimates and to calculate an average noise power based on the noise statistics.

23. The signal-to-interference ratio processor of claim 22 wherein the offset parameter is derived from at least one of a count of despread values processed by the wireless receiver and a count of the paths of the multi-path channel processed by the wireless receiver.

24. The signal-to-interference ratio processor of claim 19 wherein the initial signal-to-interference ratio calculator calculates the initial signal-to-interference ratio based on channel estimates and noise statistics derived from the received signal.

25. The signal-to-interference ratio processor of claim 24 wherein the initial signal-to-interference ratio calculator comprises:
a weight calculator to calculate weighting factors based on the channel estimates;
one or more power estimators to generate a signal power estimate and a noise power estimate based on the weighting factors; and
a combiner to derive the initial signal-to-interference ratio from the signal power estimate and the noise power estimate.

26. The signal-to-interference ratio processor of claim 24 wherein the initial signal-to-interference ratio calculator comprises an inverse quadratic computer to calculate the initial signal-to-interference ratio based on the channel estimates and the noise statistics.

27. The signal-to-interference ratio processor of claim 26 wherein the initial signal-to-interference ratio calculator further comprises a channel estimation processor to calculate modified channel estimates based on the channel estimates, wherein the inverse quadratic computer generates the initial signal-to-interference ratio based on the modified channel estimates and the noise statistics.

28. The signal-to-interference ratio processor of claim 27 wherein the channel estimation processor comprises:
a channel estimation matrix calculator to calculate a channel estimation matrix based on the noise statistics; and
a matrix multiplier to generate the modified channel estimates based on the channel estimates and the channel estimation matrix.

29. The signal-to-interference ratio processor of claim 19 wherein the wireless receiver is disposed in at least one of a mobile station and a base station.

30. The signal-to-interference ratio processor of claim 19 wherein the average signal-to-interference ratio calculator generates the average signal-to-interference ratio based on the received signal.

31. The signal-to-interference ratio processor of claim 19 wherein the average signal-to-interference ratio calculator smoothes past signal-to-interference values to generate the average signal-to-interference.

32. The signal-to-interference ratio processor of claim 19 wherein the average signal-to-interference ratio calculator identifies a target signal-to-interference ratio as the average signal-to-interference ratio.

33. A signal-to-interference ratio processor in a wireless receiver for removing bias from an initial signal-to-interference ratio, the signal-to-interference ratio processor comprising:
an initial signal-to-interference ratio calculator to calculate the initial signal-to-interference ratio based on a signal received by the wireless receiver;
an average signal-to-interference ratio calculator to generate an average signal-to-interference ratio, said average signal-to-interference ratio calculator comprising:
a signal statistics estimator to estimate a signal correlation matrix based on the channel estimates; and
an average signal-to-interference ratio estimator to calculate the average signal-to-interference ratio based on the signal correlation matrix and the noise statistics, the average signal-to-interference ratio estimator comprising a matrix multiplier to square a channel estimation matrix derived from the signal correlation matrix and the noise statistics and wherein the average signal-to-interference ratio estimator estimates a different average signal-to-interference ratio based on the squared channel estimation matrix; and a bias remover comprising:
  a converter to calculate a scaling factor by modifying the average signal-to-interference ratio by an offset parameter derived from at least one of a count of despread values processed by the wireless receiver and a count of delay paths in a multi-path channel processed by the wireless receiver; and
  a multiplier to multiply the initial signal-to-interference ratio by the scaling factor to remove the bias from the initial signal-to-interference ratio.

34. The signal-to-interference ratio processor of claim 33 wherein the offset parameter is derived from at least one of the channel estimation matrix and a count of despread values processed by the wireless receiver.

35. The signal-to-interference ratio processor of claim 33 wherein the initial signal-to-interference ratio calculator calculates the initial signal-to-interference ratio based on channel estimates and noise statistics derived from the received signal.

36. The signal-to-interference ratio processor of claim 35 wherein the initial signal-to-interference ratio calculator comprises:
  a weight calculator to calculate weighting factors based on the channel estimates;
  one or more power estimators to generate a signal power estimate and a noise power estimate based on the weighting factors; and
  a combiner to derive the initial signal-to-interference ratio from the signal power estimate and the noise power estimate.

37. The signal-to-interference ratio processor of claim 35 wherein the initial signal-to-interference ratio calculator comprises an inverse quadratic computer to calculate the initial signal-to-interference ratio based on the channel estimates and the noise statistics.

38. The signal-to-interference ratio processor of claim 37 wherein the initial signal-to-interference ratio calculator further comprises a channel estimation processor to calculate modified channel estimates based on the channel estimates, wherein the inverse quadratic computer generates the initial signal-to-interference ratio based on the modified channel estimates and the noise statistics.

39. The signal-to-interference ratio processor of claim 38 wherein the channel estimation processor comprises:
  a channel estimation matrix calculator to calculate a channel estimation matrix based on the noise statistics; and
  a matrix multiplier to generate the modified channel estimates based on the channel estimates and the channel estimation matrix.

40. The signal-to-interference ratio processor of claim 33 wherein the average signal-to-interference ratio calculator smoothes past signal-to-interference values to generate the average signal-to-interference.

* * * * *

UNITED STATES PATENT AND TRADEMARK OFFICE
CERTIFICATE OF CORRECTION

PATENT NO. : 8,599,972 B2
APPLICATION NO. : 10/869456
DATED : December 3, 2013
INVENTOR(S) : Bottomley et al.

Page 1 of 1

It is certified that error appears in the above-identified patent and that said Letters Patent is hereby corrected as shown below:

On Title Page 2, in Item (56), under "OTHER PUBLICATIONS", in Column 2, Line 21, delete "Fahmer, A.," and insert -- Fahrner, A., --, therefor.

In the Specification:

In Column 8, Line 14, delete "provide" and insert -- provided --, therefor.

In the Claims:

In Column 15, Line 50, in Claim 21, delete "signal to interference" and insert -- signal-to-interference --, therefor.

Signed and Sealed this
Twenty-second Day of July, 2014

Michelle K. Lee
*Deputy Director of the United States Patent and Trademark Office*